E. W. BULLARD.
FENCE-POST.

No. 192,053.　　　　　　　　Patented June 19, 1877

"earth or ground"

Attest

A B Brown.
P H Smith.

Inventor.

E W Bullard
per atty
James G Arnold.

UNITED STATES PATENT OFFICE.

EZEKIEL W. BULLARD, OF BARRE, MASSACHUSETTS.

IMPROVEMENT IN FENCE-POSTS.

Specification forming part of Letters Patent No. 192,053, dated June 19, 1877; application filed January 31, 1877.

*To all whom it may concern:*

Be it known that I, EZEKIEL W. BULLARD, of Barre, in the county of Worcester and State of Massachusetts, have invented certain Improvements in Posts for Fences, of which the following is a specification:

My invention relates to the construction of the posts so as to facilitate their insertion into the ground with the least possible disturbance of the earth, and thus greatly facilitating the erection of a fence and form a firmly-set post for its support, and also to protect it from disturbance by cattle and other animals by its peculiar construction, which enables me to protect it by numerous barbs.

Its nature is shown in the following description and accompanying drawings, in which—

Figure 1:
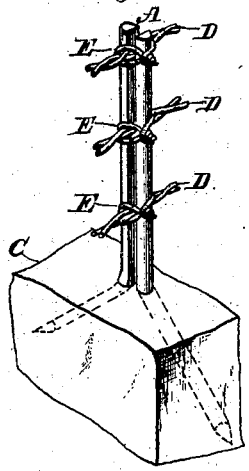
Figure 2:
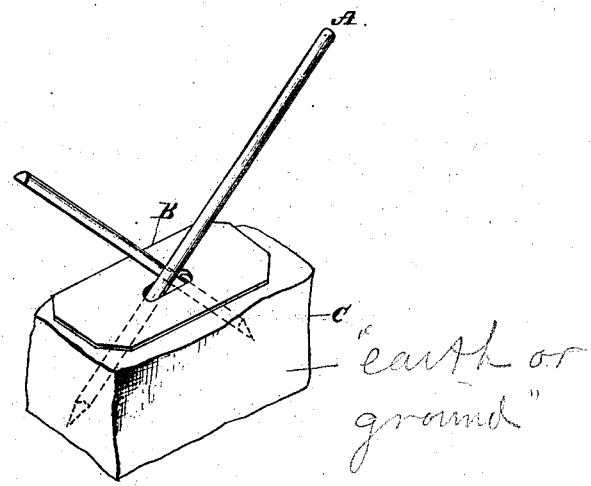
Figure 3:
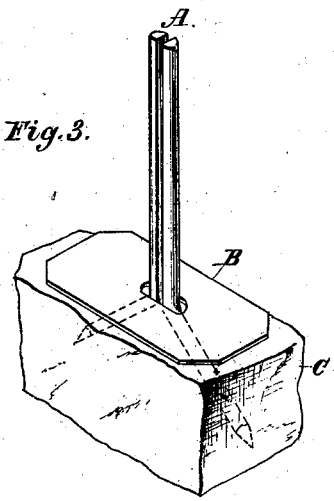
Figure 4:
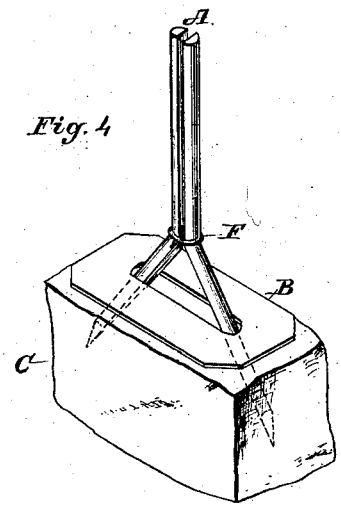

Figure 1 is a perspective view of a post embodying my invention as applied to a wire fence. Fig. 2 shows the manner of driving the parts of the post; Fig. 3, the same bent into position ready for the ties and fence; Fig. 4, a variation hereinafter more fully described; the same letters indicating corresponding parts in all.

C represents the earth or ground in which the post is to stand. B shows a plate temporarily laid on the ground, with a hole large enough for the two parts A of the post to pass through. The ends of the hole in the plate B may be made sloping, and thus guide the parts at the desired angle. The parts A of the post I prefer to make of half-round iron, though any suitable material may be used. These are made straight and driven through the hole in the plate B at opposite angles into the ground, as shown in Fig. 2. The parts above the plate are then bent up to a perpendicular position and moved a little sidewise, bringing them opposite each other, as in Fig. 3. This may be readily done by the workman standing on the plate B and bending them into place. The plate B is then removed and placed ready for another. To complete the post the parts A are tied or firmly bound together by ties, with the fence-wires D D D passing between. The ties E E E I make of wire, preferring two pieces, and passing one piece above the wire D on one side, and below it on the other, and twisting its two ends into a barb or point at right angles to the line of fence, passing the second piece in a similar manner, crossing the first, and making its barb or point on the opposite side, as seen in Fig. 1, thus forming permanent barbs or points on the post, protecting it from disturbance by animals.

The advantages of my invention are obvious in its simplicity of construction, its facility of setting, and firm hold and support obtained by its being driven into the ground without digging or loosening it; but, on the contrary, serving to make it more compact, and its protection by its barbs from the pushing or rubbing of animals.

It is evident that some variations of my invention may be made, as a longer hole in the plate B might be used, driving the parts in some distance apart and bending them at the first tie, as in Fig. 4, or by bending them partly at the plate and partly at that tie, or by giving them a sweep or curve from the ground to the first tie; and also, when it may be desirable to stiffen the post sidewise, a third post or a fourth might be used, driven at different angles, and their standing parts all tied into one.

I am aware that posts have been made of two or more parts with the fence held between them, and the lower parts bent to form braces, with their ends secured in blocks of wood or stone to be set into or on the ground, and that posts have also been made with parts to be bent by the action of driving into the ground. These I do not claim; but What I do claim, and desire to secure by Letters Patent, is—

1. The post described, consisting of two or more parts driven into the ground at diverging inclinations, and having their upper parts in upright position, and secured together holding the fence between them, substantially in the manner and for the purposes above set forth.

2. The barbed post described, having barbs formed of the ends of the wires E E, making the binders or withes, substantially as and for the purposes described.

In testimony whereof I have set my hand to the above specification this 26th day of January, A. D. 1877, in the presence of two witnesses.

EZEKIEL W. BULLARD.

Witnesses:
HENRY J. SHATTUCK,
A. G. WHEELOCK.